United States Patent [19]

Provost

[11] Patent Number: 4,642,045
[45] Date of Patent: Feb. 10, 1987

[54] POST-COMBUSTION GAS-BURNER OF A HYDROGEN PEROXIDE EMULSION

[76] Inventor: Charles Provost, 3 Place de la Monnaie, 44000 Nantes, France

[21] Appl. No.: 726,003
[22] PCT Filed: Sep. 26, 1983
[86] PCT No.: PCT/FR83/00189
  § 371 Date: Apr. 22, 1985
  § 102(e) Date: Apr. 22, 1985
[87] PCT Pub. No.: WO85/01568
  PCT Pub. Date: Apr. 11, 1985

[30] Foreign Application Priority Data

Apr. 14, 1982 [FR] France ................. 82 06627

[51] Int. Cl.[4] ............................ F23J 7/00
[52] U.S. Cl. ......................... 431/4; 431/284; 431/265
[58] Field of Search ................. 431/265, 284, 4

[56] References Cited

U.S. PATENT DOCUMENTS 2,220,603 11/1940 Hirtz.
2,368,178 1/1945 Turpin .................. 431/284
3,220,461 11/1965 Richardson .............. 431/265
3,251,393 5/1966 Beach et al. ............. 431/347
4,389,188 6/1983 Kamath ................. 431/284

FOREIGN PATENT DOCUMENTS 1174008 7/1964 Denmark.
2223631 11/1973 Denmark.
1110484 2/1956 France.
1536372 8/1968 France.
0116740 9/1979 Japan ................... 431/265

Primary Examiner—Carroll B. Dority, Jr.
Attorney, Agent, or Firm—Burns, Doane, Swecker & Mathis

[57] ABSTRACT

A post-combustion apparatus and method utilize an emulsion of hydrogen peroxide, water and oil to enhance combustion efficiency. The apparatus includes a power-driven gear pump to supply the emulsion to an atomizer centered in a gas pipe. Also included are ignition electrodes for igniting a gas-fed burner and an ionization probe for controlling the combustion process. A separation cone protects the ignition electrodes and the ionization electrodes, and a cast-iron diaphragm drilled with holes promotes the dissociation of the emulsion.

7 Claims, 2 Drawing Figures

POST-COMBUSTION GAS-BURNER OF A HYDROGEN PEROXIDE EMULSION

FIELD OF INVENTION

This invention relates to gas combustion and burners, whose function is to cause and maintain the combustion by mixing a fuel and an oxidizer.

BACKGROUND OF THE INVENTION

In known apparatuses of this type, some are of the atmospheric air type such as a VENTURI system or of the type having air pulsed by a fan. These devices have the disadvantage of using air as an oxidizer, hence a considerable loss of energy due to the fact that oxygen alone participates in the combustion reaction, whereas nitrogen, a neutral gas, absorbs a considerable part of the power energy during the endothermic process of the chemical reaction and is evacuated in the fumes or, rather, combustion by-product gas.

OBJECTS AND SUMMARY OF THE INVENTION

The present invention utilizes the differences in temperature of the hydrogen-oxygen flames, i.e. 3100 degrees K. (in relation to the absolute degree °K.) and 260° K. in the case of hydrogen-air in the proportion of 1/2.4 per ccm. In order to become familiar with the combustion process, an understanding of elementary reactions is required; it is not merely sufficient to identify the elementary chemical reactions. One also has to know the probability of reaction of the molecules concerned when they meet, since most of the collisions will not give rise to a chemical reaction. The chances of reaction depend upon the relative speed of the molecules at the time of the impact; generally, the more violent the impact, the more chance there is of a reaction occurring.

As the frequency of the collisions and the molecular speed increase with the gas temperature, the probability of reaction increases with this temperature. As this inversion relates to hydrogen combustion, a simple element with "H" as its symbol, it appears necessary to give the main parameters: atomic weight "1" in the classification:

| | |
|---|---|
| Specific weight | 0.08982 |
| Density | 0.06948 |
| Viscosity × 6.8 | 15.3 |
| M.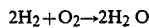 | 1.0080 |
| 1 dcm$^3$ (1 liter) | 0.0982 |
| 1 m$^3$ | 89 gr 82 |
| Cubic expansion coefficient | × 10$^6$ 3660.3 |
| Theoretic air necessary for combustion | 2.4/1 m$^3$ |
| Water steam 1 − PCS = | 3.05 (th · m$^3$) |
| PCI − 2.57 (th · m$^3$) | |

And the chemical reaction of the combustion:

$$2H_2 + O_2 \rightarrow 2H_2O$$

In the present invention and in order to avoid the partial loss of energy, as mentioned above for nitrogen, an atomized emulsion of hydrogen peroxide $H_2O_2$, water and soluble oil is injected into the flame of the hydrocarbon or natural gas, right into the middle of this flame, the gas burner flame being the "match" designed to cause and maintain the post-combustion of the above-mentioned emulsion. The blue flame produced by the gas, with a low radiating capacity, turns to a shade of orange with a high radiating capacity, thus increasing combustion efficiency and yield by releasing the hydrogen and the oxygen contained in the emulsion. The initial heat power of the gas is therefore increased by the combustion of the hydrogen produced. The released water turns into steam, according to one preferred embodiment of the invention. The means by which the emulsion is submitted to pressure is a power-driven gear pump with an adjustable discharge flap, the soluble oil of the emulsion acting as a lubricant of this pump. The burner also comprises a cone designed to separate the $H_2O_2$ emulsion from the pre-ignition electric arc and from the combustion control ionic probe; it also comprises a fireproof cast-iron disc at the front of the nose or nozzle of the said burner, which is adjustable lengthwise. This disc is drilled with truncated holes (nozzles) designed to complete the emulsion dissociation and to "break" the $H_2O_2$ molecules.

In another preferred embodiment of the invention, the means used to put the emulsion under pressure can be effected by connecting it to the city water network coupled to a hydrogen peroxide dosingmeter.

By acting on the emulsion flow rate, the device according to the invention enables the flame temperature to be adjusted and maintained at the optimum heat for emulsion molecule dissociation.

BRIEF DESCRIPTION OF THE DRAWING

Other objects, advantages and novel features of the present invention will become apparent from the following detailed description of the invention when considered in conjunction with the accompanying drawing, wherein.

DETAILED DESCRIPTION OF THE PREFERRED EMBODIMENTS

Figure 1:
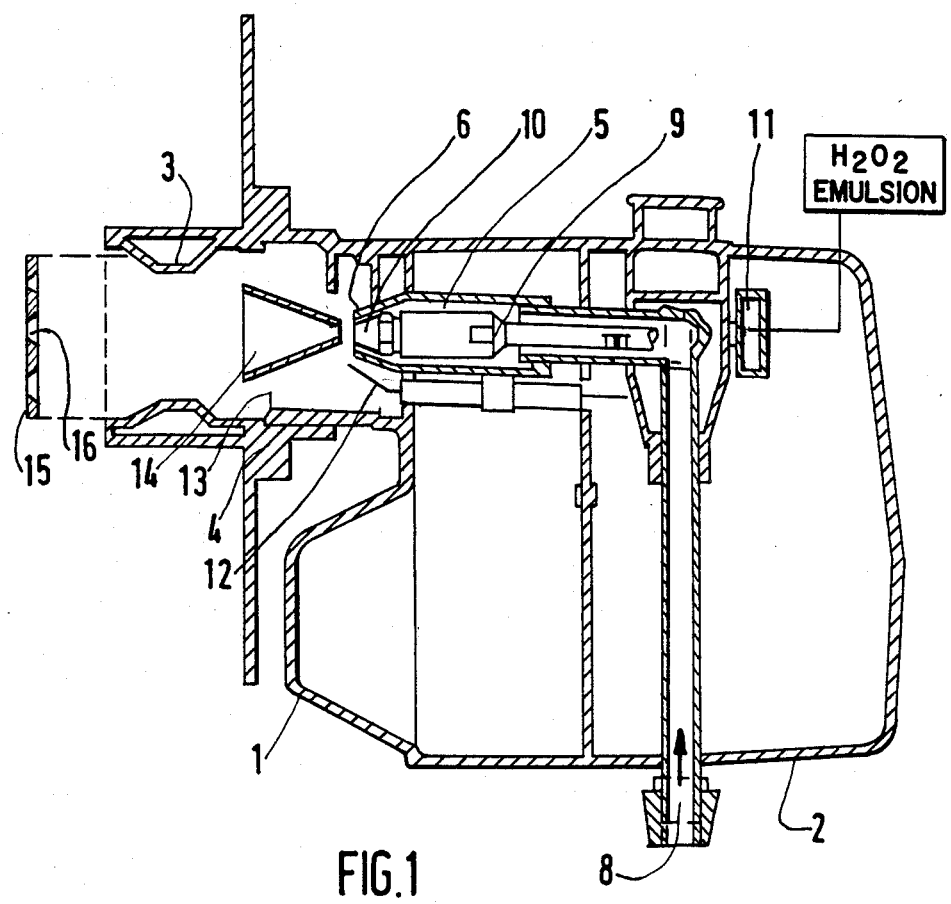
FIG. 1 is a sectional side view of a burner in accordance with a first preferred embodiment of the present invention.

As shown, the device comprises a casing 1 and a cover 2 secured to the casing 1, a nozzle 3 adjacent one side of the casing 1, a nozzle flange 4, a gas-pipe 5 extending toward the nozzle 3 and an injector 6 at one end of the gas pipe 5. A gas inlet tube 8 extending into the cover 2 supplies gaseous fuel from an external source to the gas pipe 5. In the center of the gas-pipe 5 is a line pipe 9 having an atomizer 10. An emulsion of $H_2O_2$, water and soluble oil is supplied to the line pipe 9 under pressure by the power-driven gear pump 11 which pump receives the emulsion from an external source. The device also includes gaseous mixture ignition electrodes 12 for igniting the gaseous fuel emitted from the injector 6 and an ionization electrode 13 for controlling the combustion process and a cone 14 designed to protect the ionization electrode 13 and the ignition electrodes 12 from the atomized emulsion discharged from the atomizer 10. The nozzle 3 includes, at its front, a cast-iron diaphragm 15 drilled with a plurality of truncated holes 16 adapted to complete the dissociation of the injected emulsion and to "break" the $H_2O_2$ molecules.

In operation, the gaseous fuel expelled from the injector 10 is combusted to form a burner flame with air supplied by a VENTURI system, a fan or other system well-known to those skilled in the pertinent art. Ignition of the burner flame is achieved with the ignition electrodes 12. In order to enhance the heat power of the burner flame, an emulsion of hydrogen peroxide, water and soluble oil is discharged into a central region of the flame from the atomizer 10 under pressure applied by the gear pump 11. The resultant flame is directed through the nozzle 3 and its cast iron diaphragm 15. The plurality of truncated holes 16 in the diaphragm 15 complete the dissociation of the emulsion and "break" the $H_2O_2$ molecules. As a result, oxygen and hydrogen are released which assist combustion so as to enhance combustion efficiency.

Figure 2:
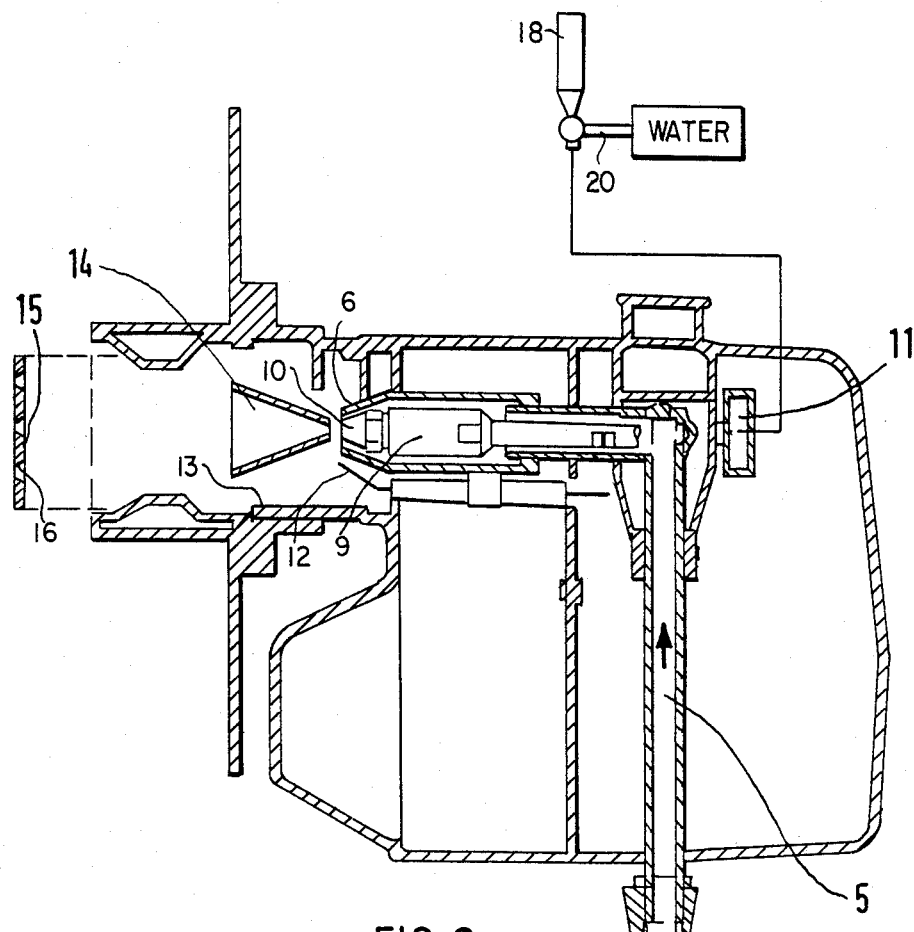
FIG. 2 is a sectional side view of a burner in accordance with a second preferred embodiment of the present invention.

Referring to FIG. 2, in a second preferred embodiment, the source of a continuous supply of the emulsion comprises a dosingmeter 18 for adding doses of hydrogen peroxide at controlled rates to a conduit 20 connected to a city water network. In both embodiments, the soluble oil of the emulsion acts as a lubricant for the pump 11.

The device featured in the invention can be used on all gas-burners, enabling power to be increased by approximately 50% with no considerable additional exploitation costs, owing to the hydrogen and oxygen produced by the dissociation of the $H_2O_2$ emulsion.

The applications of the invention can be used with all gas-burners with an appreciable saving in cost and gain in safety.

It is to be understood that the present invention may be embodied in other specific forms without departing from the spirit or essential characteristics of the present invention.

The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A method for increasing the flame temperature of combustion gases, comprising the steps of combusting said combustion gases while injecting an atomized emulsion of hydrogen peroxide, water and soluble oil into said combustion gases, whereby heat power of said combustion gases is increased.

2. The method as set forth in claim 1, wherein said combusting step produces a burner flame and said atomized emulsion is injected into said burner flame.

3. The method as set forth in claim 2, wherein said atomized emulsion is injected into a middle region of said burner flame.

4. A device for injecting an atomized emulsion of hydrogen peroxide, water and soluble oil into combustion gases so as to enhance combustion output, comprising:
   an injector;
   first supply means for supplying combustion gas to said injector, said supply means including a gas pipe;
   a line pipe positioned coaxially in said gas pipe;
   a source of said emulsion;
   second supply means for supplying said emulsion from said source to said line pipe under pressure;
   means for atomizing said emulsion, said atomizing means being located along said line pipe; and
   a nozzle downstream of said injector and said line pipe.

5. The device as set forth in claim 4, wherein said second supply means includes a gear pump.

6. The device as set forth in claim 5, wherein said source includes a dosingmeter adapted to controllably add doses of hydrogen peroxide to a mixture of oil and water.

7. The device as set forth in claim 4, further comprising a diaphragm positioned downstream of said nozzle, said diaphragm having truncated holes extending through said diaphragm, whereby dissociation of said emulsion and of hydrogen peroxide molecules is enhanced.

* * * * *